United States Patent [19]

Caron

[11] Patent Number: 4,741,590
[45] Date of Patent: May 3, 1988

[54] FIBER OPTIC CONNECTOR

[75] Inventor: Bernard G. Caron, Harrisburg, Pa.

[73] Assignee: AMP Incorporated, Harrisburg, Pa.

[21] Appl. No.: 932,254

[22] Filed: Nov. 19, 1986

Related U.S. Application Data

[60] Division of Ser. No. 810,826, Dec. 18, 1985, which is a continuation of Ser. No. 501,597, Jun. 6, 1983, abandoned, which is a continuation-in-part of Ser. No. 415,123, Sep. 7, 1982.

[51] Int. Cl.$^4$ ............................ G02B 6/38; G02B 6/36
[52] U.S. Cl. ................................ 350/96.21; 350/96.20
[58] Field of Search ................. 350/96.20, 96.21, 96.22

[56] References Cited

U.S. PATENT DOCUMENTS

| | | | |
|---|---|---|---|
| 3,999,837 | 12/1976 | Bowen et al. | 350/96 C |
| 4,084,308 | 4/1978 | Runge | 350/96.20 X |
| 4,127,319 | 11/1978 | Forney, Jr. et al. | 350/96.22 X |
| 4,178,068 | 12/1979 | Hoover | 350/96.21 |
| 4,186,998 | 2/1980 | Holzman | 350/96.20 X |
| 4,233,724 | 11/1980 | Bowen et al. | 29/428 |
| 4,418,983 | 12/1983 | Bowen et al. | 350/96.20 |
| 4,447,121 | 5/1984 | Cooper et al. | 350/96.21 X |
| 4,614,402 | 9/1986 | Caron et al. | 350/96.21 |
| 4,645,296 | 2/1987 | Cattin et al. | 350/96.21 |
| 4,676,588 | 6/1987 | Bowen et al. | 350/96.21 |
| 4,679,895 | 7/1987 | Huber | 350/96.20 |

*Primary Examiner*—William L. Sikes
*Assistant Examiner*—Akm E. Ullah

*Attorney, Agent, or Firm*—Adrian J. LaRue; Anton P. Ness

[57] ABSTRACT

A fiber optic connector comprises a housing member and ferrule members. The housing member is rigid and has a profiled bore extending therethrough. The bore has a central cylindrical bore portion, tapered bore portions on each side of the central cylindrical bore portion, and a support bore portion at the outer end of each tapered bore portion. The ferrule members are of resilient deformable material and are teminated onto fiber optic transmission members. Each ferrule member has a profiled front end comprising a front cylindrical section of slightly larger diameter than the central cylindrical bore portion, a tapered section slightly smaller than the corresponding tapered bore portion and an alignment section for tight engagement with the corresponding support bore portion. A coupling member engages shoulder members of the ferrule members urging the profiled front ends into the profiled bore with the front cylindrical sections tightly engaging the central cylindrical bore portion thereby applying a radial compressive force to the front cylindrical sections and centering the fiber optic transmission members and the alignment sections of the ferrule members tightly engaging the corresponding support bore portions of the housing member to maintain the ferrule members and their fiber optic transmission members therewithin in axial alignment when lateral forces are applied to the ferrule members.

12 Claims, 3 Drawing Sheets

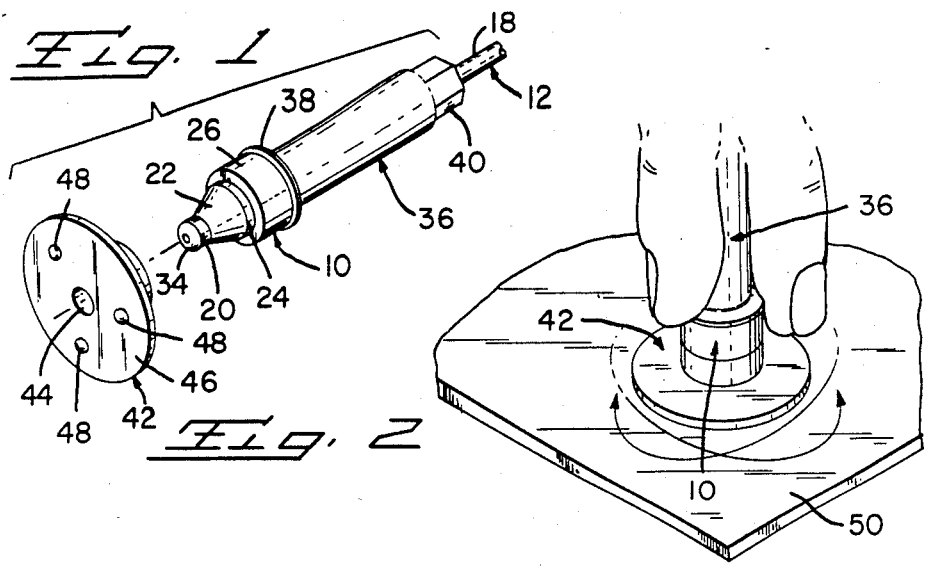
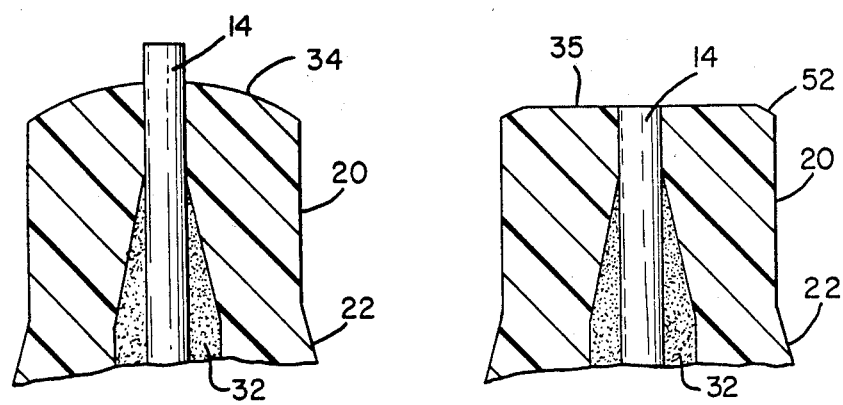
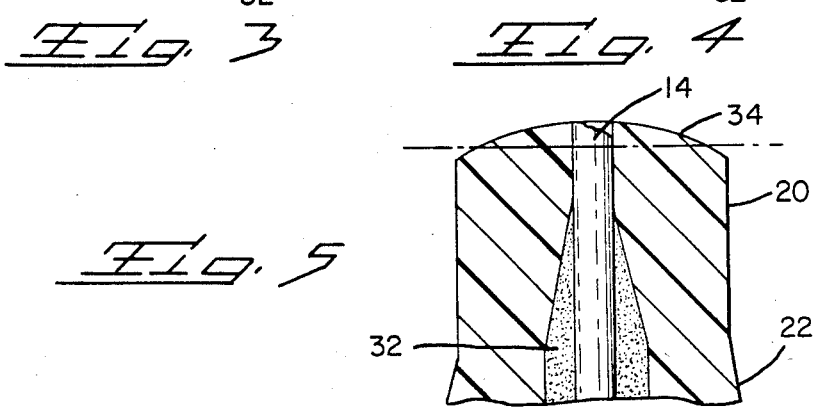

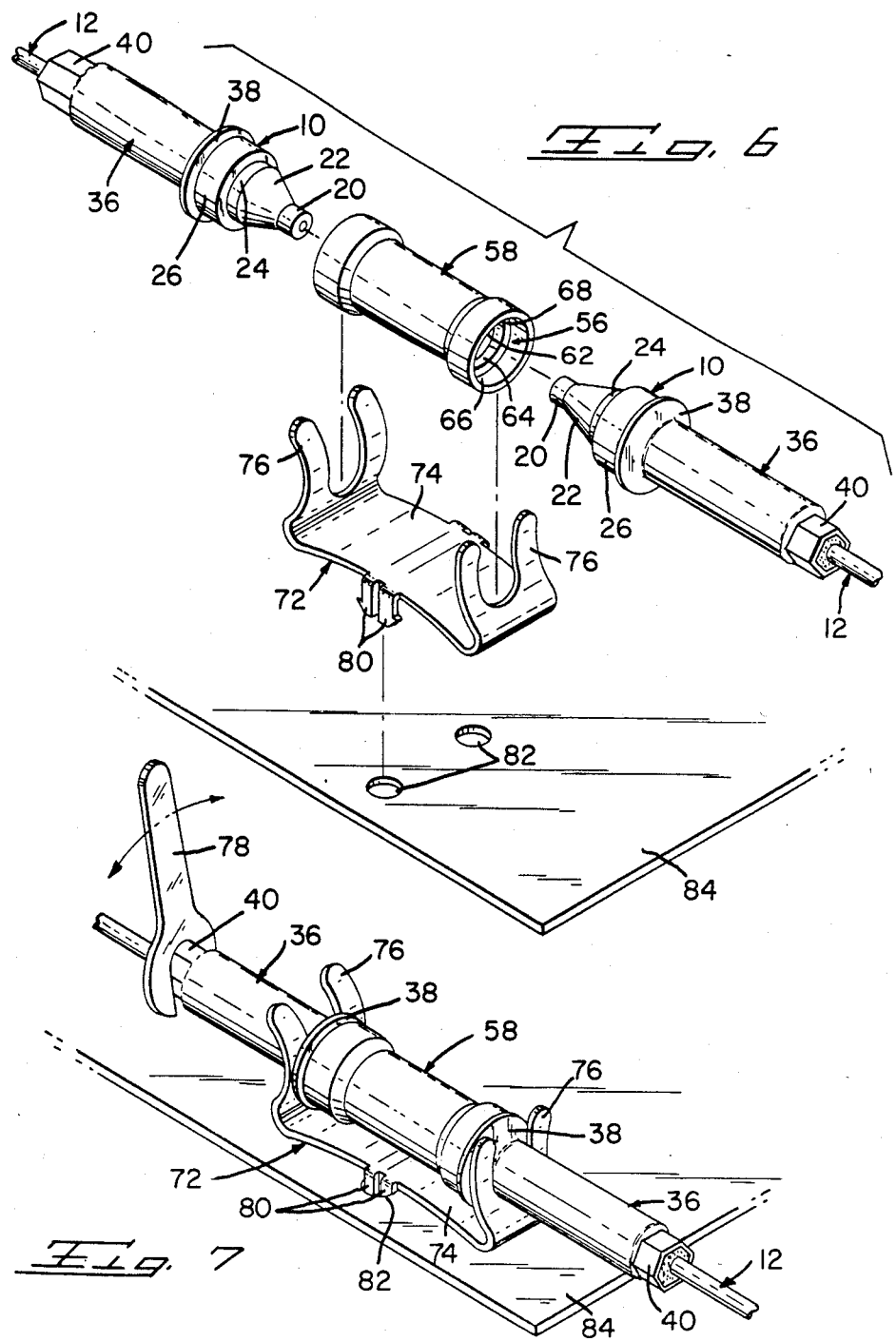

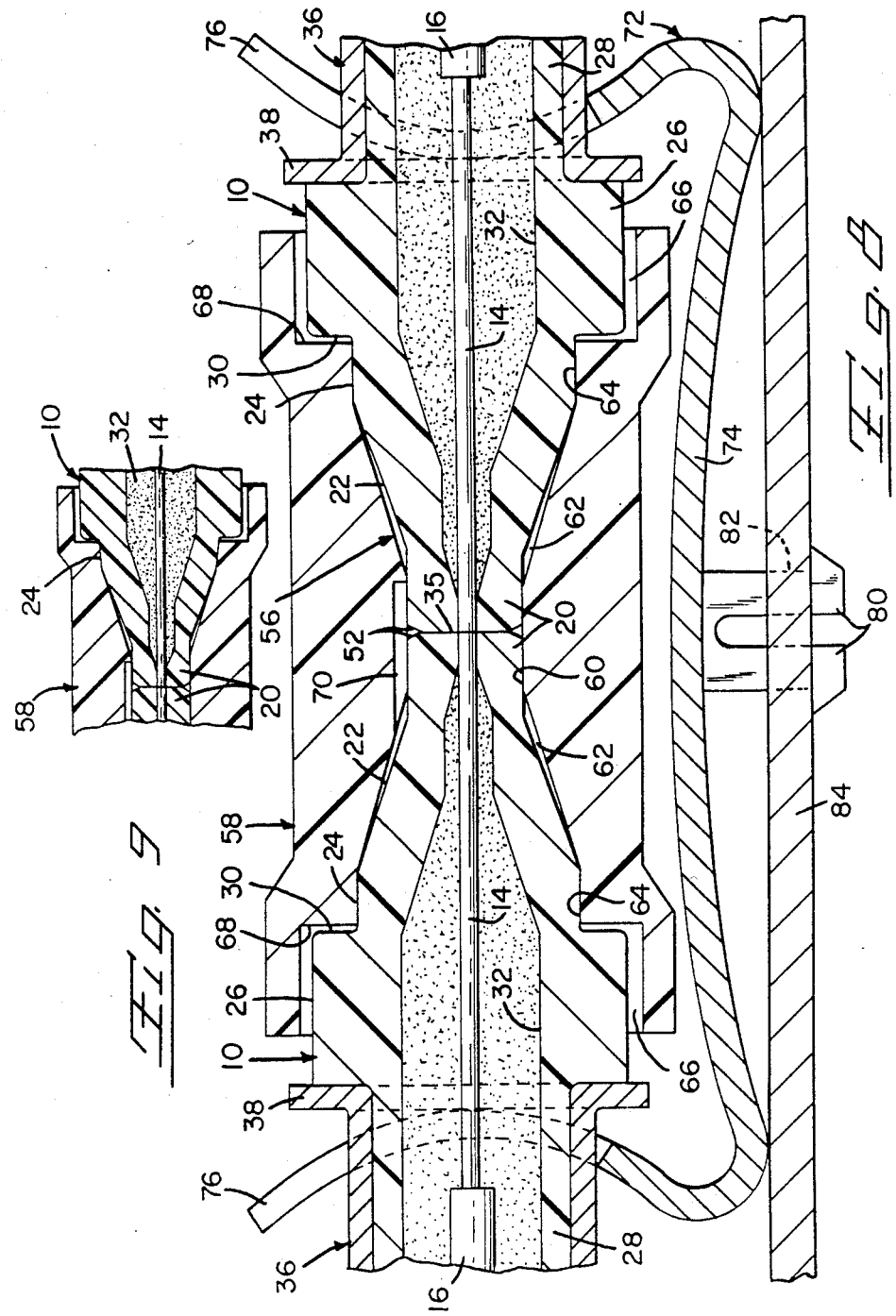

FIBER OPTIC CONNECTOR

REFERENCE TO RELATED APPLICATIONS

This is a divisional of application Ser. No. 810,826 filed Dec. 18, 1985 which is a continuation of application Ser. No. 501,597 filed June 6, 1983 now abandoned, which was a continuation-in-part of application Ser. No. 415,123 filed Sept. 7, 1982.

FIELD OF THE INVENTION

This invention relates to connectors and more particularly to fiber optic connectors for terminating fiber optic transmission members including matable supporting surfaces.

BACKGROUND OF THE INVENTION

U.S. Pat. No. 3,999,837 discloses a fiber optic connector which comprises a housing member and ferrule members terminated onto exposed ends of fiber optic transmission members. The housing member has a profiled bore including a center cylindrical section and outer first and second identically-shaped sections of different diameters. The ferrule members have cylindrical nose sections that tightly fit into the cylindrical section of the housing, tapered sections that engage the outer first and second sections, and annular shoulders that engage rearwardly facing surfaces of the housing member. Coupling members on the ferrule members are coupled to the housing member securing the ferrule members in the profiled bore with the cylindrical section applying radial compressive forces to the cylindrical nose sections thereby axially aligning the fiber optic transmission members and the annular shoulders engage the surfaces of the housing member limiting movement of the ferrule members into the profiled bore, positioning the front surfaces of the ferrule members adjacent each other and minimizing misalignment of the fiber optic transmission members when lateral forces are applied to the ferrule members.

When the annular shoulders of the ferrule members do not engage the axial surfaces of the housing member, lateral forces can cause misalignment of the fiber optic transmission members. Misalignment of single mode and multimode fibers can result in signal loss or degradation.

SUMMARY OF THE INVENTION

According to the present invention, a fiber optic connector comprises a housing member and ferrule members. The housing member is rigid and has a profiled bore extending therethrough. The bore has a central cylindrical bore portion, tapered bore portions on each side of the central cylindrical bore portion, and a support bore portion at the outer end of each tapered bore portion. The ferrule members are of resilient deformable material, and each is terminated onto a respective fiber optic transmission member. Each ferrule member has a front end comprising a front cylindrical section of slightly larger diameter than the central cylindrical bore portion, a tapered section slightly smaller than the tapered bore portion, and an alignment section for tight engagement with the support bore portion. A coupling member engages shoulder members of the ferrule members applying an axial force thereto urging them into the housing and urging the profiled front ends into the profiled bore. In the housing member the front cylindrical sections being tightly engaged by the central cylindrical bore portion at a first or forward location along the ferrule thereby receiving a radial compressive force to the front cylindrical sections and centering and axially aligning the fiber optic transmission members, and with the alignment sections of the ferrule members being tightly engaged by the support bore portions of the housing member at respective second or rearward locations along the ferrule members, to maintain them and thereby their respective fiber optic transmission members in axial alignment when lateral forces are applied to the ferrule members.

BRIEF DESCRIPTION OF THE DRAWINGS

FIG. 1 is a perspective view of a ferrule member terminated to a fiber optic transmission member and a polishing fixture exploded therefrom.

FIG. 2 is a perspective view showing the polishing of the front end of the ferrule member and fiber optic transmission member.

FIG. 3 is a longitudinal section view of the front end of the ferrule member terminated onto a fiber optic transmission member prior to polishing.

FIG. 4 is a view similar to FIG. 3 after the front end of the ferrule member and fiber optic transmission member have been polished.

FIG. 5 is a view similar to FIG. 3 showing a cleaved end of a fiber optic transmission member prior to polishing the front end of the terminated ferrule member.

FIG. 6 is a perspective and exploded view of a fiber optic connector utilizing ferrule members of FIG. 4.

FIG. 7 is a view similar to FIG. 6 showing the connector in an assembled condition and being fine tuned to accurately align the axes of the fiber optic transmission members.

FIG. 8 is a longitudinal section view of FIG. 7.

FIG. 9 is a part longitudinal section view of an alternative embodiment.

DETAILED DESCRIPTION OF THE INVENTION

A ferrule member 10 is terminated onto an end of a fiber optic cable 12. The fiber optic cable 12 includes a fiber optic transmission member 14 surrounded by cladding material to enable light to be transmitted therealong. Buffer material 16 as shown in FIG. 8 protects the cladded fiber optic transmission member 14 and an outer jacket 18 protects the entire cable assembly. The cable typically includes strength members (not shown) to provide tensile strength thereto. Fiber optic cable 12 is stripped to expose a length of fiber optic transmission member 14 to enable it to be terminated in ferrule member 10. Fiber optic transmission member 14 can be either plastic or glass.

Ferrule member 10 is preferably molded from a suitable plastic material having resilient characteristics. Ferrule member 10 is of the type disclosed in U.S. Pat. No. 3,999,837, the disclosure of which is completely incorporated herein by reference. Ferrule member 10 has a profiled front end which comprises a front cylindrical section 20, a tapered transition section 22, an intermediate cylindrical alignment 24, a rear cylindrical section 26, and a tubular section 28. A shoulder 30 is located at the junction of sections 24 and 26. A profiled bore 32 extends through ferrule member 10 and necks down in front cylindrical section 20 to a diameter to accommodate fiber optic transmission member 14. Front surface 34 of ferrule member 10 has a domed configuration when formed as best illustrated in FIG. 3. A metal ferrule 36 is disposed on tubular section 28 and has a flange 38 in engagement with section 26. Outer end 40 of metal ferrule 36 has a hexagonal or other suitable configuration.

Fiber optic cable 12 is terminated in ferrule member 10 by inserting a stripped end of fiber optic cable 12 within bore 32 until a short section of fiber optic transmission member 14 extends outwardly beyond domed front end 34. An epoxy resin can be located in bore 32 to secure fiber optic transmission member 14 in position in ferrule member 10, whereafter metal ferrule 36 is crimped onto outer jacket 18 of fiber optic cable 12 thereby terminating fiber optic cable 12 in ferrule member 10. The section of fiber optic transmission member 14 that extends beyond domed front end 34 is removed by cutting, if transmission member 14 is plastic, or is cleaved, if transmission member 14 is glass. Fiber optic cable 12 can be secured in ferrule member 10 in accordance with the teachings of U.S. Pat. application Ser. No. 381,495 filed May 24, 1982 or in any other suitable manner.

After fiber optic cable 12 has been terminated in ferrule member 10, the profiled front end of ferrule member 10 is frictionally positioned in a profiled bore 44 of polishing fixture 42; bore 44 has the same configuration as that of sections 20, 22, and 24 of ferrule member 10 except that they are dimensioned to compress section 20 in tight engagement with the fiber optic transmission member 14 in bore 32 and the domed front end 34 extends beyond the outer flat surface 46 of fixture 42. Radiussed projections 48 extend outwardly from surface 46.

Terminated ferrule member 10 with fixture 42 thereon is now subjected to a polishing action by fixture 42 moving relative to a polishing medium 50 such as, for example, very fine silicon carbide or aluminum oxide grit as shown in FIG. 2 for a period of time. Radiussed projections 48 stabilize the polishing and, when they are worn away, the domed front surface 34 along with the end of fiber optic transmission member 14 are polished as a flat surface 35 and are in the same plane as illustrated in FIG. 4 leaving a radiussed peripheral surface 52 between the front polished surface 35 and the external surface of cylindrical section 20.

As shown in FIG. 5, when fiber optic transmission member 14 is glass and is cleaved, the cleaved end can be uneven. Thus, when the domed front end 34 is polished as hereinabove described, the uneven end of fiber optic transmission member 14 is polished to a flat planar configuration as shown in FIG. 4 thereby eliminating the fragmented end.

Advantages of having a domed front surface 34 are less material to polish and this reduces the amount of time to polish the front end of ferrule member 10.

Terminated ferrule members 10 can now be connected together in a profiled bore 56 of a rigid connector housing member 58 which is of the type disclosed in U.S. Pat. application Ser. No. 415,123 filed Sept. 7, 1982, the disclosure of which is incorporated herein by reference. Profiled bore 56 has a central cylindrical bore portion 60, tapered transition bored portions 62 on each side of bore portion 60, cylindrical support bore portions 64, and outer cylindrical bore portions 66. Shoulders 68 are located at the junctions between bore portions 64 and 66. A slot 70 is located in communication with central cylindrical bore portion 60 as shown in FIG. 8.

The diameters of front cylindrical sections 20 of ferrule members 10 are slightly greater than the diameter of central cylindrical bore portion 60 of bore 56 and this is also true with respect to intermediate cylindrical sections 24 of ferrule members 10 being slightly greater than cylindrical support bore portions 64 of profiled bore 56. The dimensions of tapered sections 22 of ferrule members 10 are slightly less than that of tapered bore portions 62 of profiled bore 56. Thus, when the profiled front ends of ferrule members 10 are inserted into profiled bore 56 ferrule members 10 will be tightly engaged by central cylindrical surface 60 at respective first or forward locations along the ferrules, the resilient nature of the material of ferrule member 10 will cause the front sections 20 to be compressibly reduced in diameter as a result of a radial compressive force being applied by housing member 58 thereby concentrically aligning end portions of fiber optic transmission members 14 so that they are axially aligned within central cylindrical bore portion 60 of profiled bore 56 as shown in FIG. 8. The tight engagement of intermediate cylindrical alignment sections 24 with corresponding cylindrical support bore portions 64 will support the ferrule members 10 at respective second or rearward locations therealong within bore 56 to resist lateral forces being applied to the outer ends of ferrule members 10 and to form a seal thereat as disclosed in U.S. Pat. No. 4,614,402. Depending on the tolerances involved, shoulders 30 of ferrule members 10 can abut against shoulders 68 of housing member 58 limiting the movement of ferrule members 10 within bore 56. Alignment sections 24 can be slightly tapered along with support bore portions 64, if desired, as shown in FIG. 9. Central cylindrical bore portion 60 has the smallest diameter along profiled bore 56 and is shown in FIG. 8 having an axial dimension less than twice the diameter thereof, thus tightly engaging front cylindrical ferrule sections 20 each along an axial length of less than the diameter thereof. Cylindrical support bore portions 64 of larger diameter are located axially outwardly a selected distance shown to be between one and two times the diameter of central cylindrical bore portion 60, and shown having an axial dimension less than the diameter of central cylindrical bore portion 60, thus each tightly engaging a respective alignment ferrule section 24 along an axial length less than that diameter. The total axial length of tight engagement of each ferrule 10 in tubular member 58 is substantially less than the distance from the forwardmost to the rearwardmost points of tight engagement.

In many cases, a fluid that has an index of refraction substantially equal to that of fiber optic transmission members 14 is located at the interface between the flat front surfaces 35 of ferrule members 10 which enhances the transmission of light between the fiber optic transmission members 14 and protects the front ends of the fiber optic transmission members 14 when engagement therebetween takes place. The reservoir formed by radiussed surfaces 52 at the peripheries of the front ends of sections 20 of ferrule members 10 as shown in FIG. 8 will enable the fluid to be collected therein upon expansion of the fluid as a result of higher temperatures and the fluid can also move into slot 70 if the temperatures are quite high. The fluid will be retained within the fiber optic connector by virtue of the seal formed between sections 24 and 64. Slot 70 also acts as a vent to prevent hydraulic action from taking place when index-matching fluid is used; slot 70 also can prevent entrapped air from forcing the ferrule members apart under high temperature if no index-matching liquid is used.

Spring clip member 72 forms a coupling member which engages ferrule members 10 urging them into bore 56 and maintaining them therein. Spring clip member 72 is stamped and formed from a metal having suitable spring characteristics such as, for example, spring steel, and it includes an arcuate-shaped base member 74 from the ends of which extend curved forks 76. A fiber optic connector which comprises the profiled front ends of ferrule members 10 disposed in profiled bore 56 of rigid housing 58 is positioned in spring clip member 72 with metal ferrules 36 being disposed in curved forked ends 76 as shown in FIGS. 7 and 8, with the curved forked ends 76 engaging against flanges 38 of metal ferrules 36 thereby applying axial forces onto ferrule members 10 to maintain cylindrical sections 20 in concentric alignment within central cylindrical bore portions 60 of profiled bore 56 of housing member 58 thereby maintaining fiber optic transmission members 14 in axial alignment due to the resilient characteristics of ferrule members 10. The arcuate configuration of base member 74 contributes to the spring characteristics of forked ends 76. Other types of coupling members can, of course, be used such as, for example, threaded members, bayonet members or the like, and coil springs would then be used on metal ferrules 36.

After the fiber optic connector has been positioned in spring clip member 72, light can be transmitted along fiber optic transmission members 14 to determine if further alignment is necessary. If further alignment is necessary, a wrench 78 is used on outer end 40 of metal ferrules 36 and the corresponding ferrule member 10 can be rotated to accurately align the axes of fiber optic transmission members 14.

A pair of barbed legs 80 extend outwardly from base member 74 on each side at a central location thereof for engagement with holes 82 in a mounting plate 84. Legs 80 need not be present so that spring clip member 72 can maintain the fiber optic connector in a connected condition in a free-hanging manner if desired.

From the foregoing, a fiber optic connector has been described that is sealed from the environment, can withstand wide temperature variations, can be used in many types of installations, enables the fiber optic connectors to be readily disconnected, enables the fiber optic connectors to be adjusted to provide low loss connection, enables the terminations to be tested, and provides a reservoir to accommodate expansion and contraction variations of a fluid disposed between the front ends of mated ferrule members.

I claim:

1. A fiber optic connector assembly for connecting two fiber optic transmission means together, of the type comprising a rigid housing having a profiled bore extending therethrough, said bore including a central cylindrical bore portion of selected diameter and having other bore portions outwardly therefrom towards each housing end of greater dimension than said selected diameter, and two ferrules of resiliently rigid but deformable material each terminated onto an end of a respective fiber optic transmission means secured in a central both thereof, and a means for securing each ferrule in the housing and urging the ferrules toward and to each other within the housing bore, each said ferrule having a profiled front end including a substantially flat front surface and with the front end of the fiber optic transmission means being coincident with the flat front surface, where the profiled front end of each ferrule is insertable into the profiled bore of the housing from a respective end thereof, each said profiled front end having a front cylindrical section slightly greater in diameter than the diameter of the central cylindrical bore portion along which the profiled front end is disposed so that the central cylindrical bore portion tightly engages the larger diameter front cylindrical sections of both ferrules and reduces both front cylindrical sections in diameter centering end portions of both respective fiber optic transmission means within the bore and axially aligning them, characterized in that:

said housing has a support bore portion spaced axially outwardly from each end of said central cylindrical bore portion a selected distance therefrom and having a selected diameter larger than said selected diameter of said central cylindrical bore portion, said bore having a transition portion between said central cylindrical bore portion and each said support bore portion; and each said ferrule has an alignment section means located a selected distance axially rearwardly from said front cylindrical section to be disposed along a respective said support bore portion, said alignment section means being slightly larger in dimension than said selected diameter of said respective support bore portion to be tightly and sealingly engaged thereby, said ferrule including a transition section between said front cylindrical section and said alignment section means adapted to be disposed along a corresponding said transition bore portion and substantially unengaged therewith, each said transition section being approximately as long as the combined axial lengths of said front cylindrical section and said alignment section means, and each said transition bore portion being correspondingly at least as long as said transition section, whereby the total axial length of tight engagement of each said ferrule in said housing is substantially less than the distance from the forwardmost point to the rearwardmost point of tight engagement between said ferrule and said housing, whereby said central cylindrical bore portion tightly engages each said ferrule at a respective first location and each said support bore portion tightly engages a respective said ferrule at respective second location spaced axially rearwardly from said respective first location, and whereby said housing thus tightly engages each said ferrule at two axially spaced locations axially aligning said ferrules and thereby said respective fiber optic transmission means therewithin and enabling said ferrules to resist lateral forces thereon and maintain said respective fiber optic transmission means therewithin in axial alignment.

2. A fiber optic connector as set forth in claim 1 further characterized in that each said support bore portion and each said alignment section means are cylindrical.

3. A fiber optic connector as set forth in claim 1 further characterized in that each said support bore portion and each said alignment section means are correspondingly slightly tapered outwardly proceeding axially rearwardly.

4. A fiber optic connector as set forth in claim 1 further characterized in that said central cylindrical bore portion has an axial dimension approximately less than twice said diameter thereof whereby said central cylindrical bore portion tightly engages each said front cylindrical ferrule section along an axial length approximately less than said diameter of said central cylindrical bore portion.

5. A fiber optic connector as set forth in claim 1 further characterized in that each said support bore portion has an axial dimension approximately less than said diameter of said central cylindrical bore portion whereby said support bore portion tightly engages said alignment section means of a corresponding said ferrule along an axial length approximately less than said diameter of said central cylindrical bore portion.

6. A fiber optic connector as set forth in claim 1 further characterized in that each said transition bore portion has an axial dimension approximately between one and two times the diameter of said central cylindrical bore portion whereby said first and second engagement locations are correspondingly spaced apart between one and two times said diameter of said central cylindrical bore portion.

7. A fiber optic connector as set forth in claim 1 further characterized in that said transition bore portions are tapered and said transition ferrule sections are tapered.

8. A fiber optic connector as set forth in claim 1 further characterized in that each said ferrule includes an annular shoulder section rearwardly from said alignment section means thereof and disposed within a corresponding outer cylindrical bore portion of said housing.

9. A fiber optic connector as set forth in claim 1 further characterized in that said ferrules are identical and said housing bore is symmetrical about its medial transverse plane.

10. A fiber optic connector as set forth in claim 9 further characterized in that said ferrules are urged axially into said housing bore by spring clip means.

11. A fiber optic connector as set forth in claim 9 further characterized in that a respective said ferrule has tool-engaging means for engagement by a tool to rotate said ferrule relative to said housing while light is being transmitted along the fiber optic transmission means, to accurately align the axes of the fiber optic transmission means.

12. A fiber optic connector as set forth in claim 1 further characterized in that said tool-engaging means comprises a shaped surface of a metal ferrule means secured on a tubular rear section of said ferrule extending outwardly of said housing.

* * * * *